April 30, 1957

G. A. SCHURMAN 2,790,964

LOGGING TOOL

Filed March 2, 1954

INVENTOR
GLENN A. SCHURMAN
BY
ATTORNEYS

April 30, 1957 G. A. SCHURMAN 2,790,964
LOGGING TOOL
Filed March 2, 1954 2 Sheets-Sheet 2

INVENTOR
GLENN A. SCHURMAN
BY
ATTORNEYS

United States Patent Office 2,790,964
Patented Apr. 30, 1957

2,790,964
LOGGING TOOL

Glenn A. Schurman, Whittier, Calif., assignor to California Research Corporation, San Francisco, Calif., a corporation of Delaware Application March 2, 1954, Serial No. 413,568

5 Claims. (Cl. 340—17)

My invention relates to methods and apparatus for velocity logging and especially to velocity logging with a seismometer.

The processes of measuring the time depth curve in a deep well is often complicated by the presence of a cable break. The cable break is presumed to be caused by energy which travels down the support cable to the seismometer from near the surface of the earth. In areas of low surface velocity, this signal often appears on the record as a high amplitude pulse, arriving at the seismometer before the direct wave which travels through the formation. Amplifier gains are usually set at a high level in order to obtain a clear, clean break when the direct signal reaches the seismometer. As a result, the cable break is also amplified and often obscures all subsequent detail and masks the true formation arrival.

Attempts have been made to overcome this effect by the use of a long offset for the explosive source. An offset of as much as 2,000 feet may be used in order to permit the low velocity surface wave to arrive at the derrick after the direct wave traveling through the formation arrives at the seismometer. This procedure is not entirely satisfactory in that a constant vertical formation velocity is assumed for the area between the derrick and shot point. If the formation velocity changes rapidly with depth, shallow refractions may interfere with the true characterization of velocity. The energy from the shot travels downwardly at an angle through the low velocity material and is refracted toward the well in the high velocity material, thus causing the travel path in the high velocity material to be large compared to the travel path in the low velocity material. Consequently, the average velocity for the shot will be high and the data will not be easily convertible to an accurate velocity-versus-depth function.

As an alternative to the use of long offsets, cable break isolators may be employed to reduce the magnitude of the cable break at the seismometer. While effective cable break isolators have been devised, it is difficult to provide a simple isolator that is fieldworthy and capable of withstanding the abuse it normally receives in the course of a well log. Accordingly, it is desirable to avoid the inconvenience and expense arising from the use of a cable break isolator.

Prior art logging tools of which I am aware are essentially a surface geophone within a pressure housing. The pressure housing must be strong to withstand the severe pressures within the well and heavy in order to pull the tool into the well at a reasonable speed. The heavy components of the sensing elements which consist of a magnet and pole structure are attached rigidly to the vessel. A light weight coil is suspended on a spring from the pressure housing. When the pressure housing is moved by the incoming signal, the coil tends to remain stationary. The relative movement between the pole structure and the coil causes a signal to be generated in the coil. Such a seismometer cannot differentiate between a signal arriving from the formation and a cable-borne seismic signal.

Accordingly, it is an object of my invention to provide a novel logging tool by means of which the cable break may be differentiated from the formation break.

It is a further object of my invention to provide methods and apparatus for increasing the amplitude of the formation break relative to the cable break.

It is a still further object of my invention to provide apparatus for accentuating the formation break relative to the cable break.

It is another object of my invention to provide a logging tool in which the cable energy acts upon heavy components which move only slightly while the formation energy acts on lighter elements which respond readily to vibrations in the surrounding fluid.

In apparatus according to my invention, the support cable is connected to the pole structure and weighting elements of the seismometer while the formation signal acts on the coil and case of the seismometer. By the use of such apparatus, the cable break is suppressed and the formation signal stands out in contrast.

The novel features of my invention are set forth with more particularity in the accompanying claims. The invention itself, however, with respect to the details thereof, together with its additional objects and advantages, may be better understood from the following description of a specific embodiment with reference to the accompanying drawings, in which:

Figure 1:
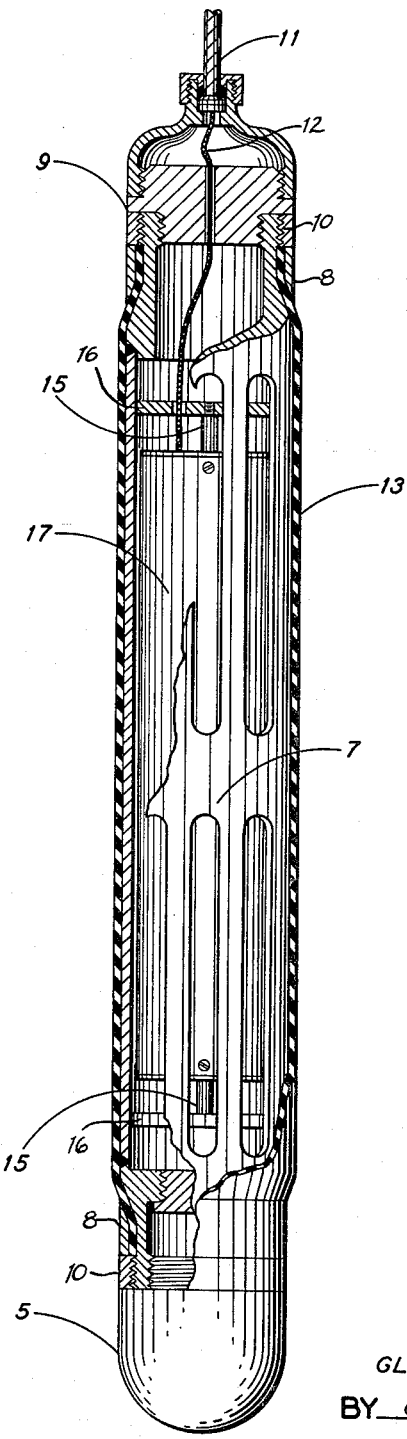
Figure 1 is a logging tool according to my invention.

As shown in Figure 1, the logging tool comprises a weight 5 threadedly fixed to an elongated, slotted, protective cage 7 which, in turn, is threadedly fixed to a head piece 9. An armored logging cable 11 is secured to the logging tool adjacent to head piece 9 and the head piece 9 is apertured to pass the electrical conductor 12 enclosed within cable 11.

A flexible boot or membrane 13 of a sound transmitting nature surrounds slotted cage 7 and is fixed to both ends of the logging tool about cage 7 by suitable wedges 8 and threaded rings 10 in a sealing fashion. I have found that rubber of a tough heat-resistant plastic serves as a satisfactory material for the boot. The boot itself does not have sufficient strength to resist high external pressure and, for that reason, the volume enclosed by the boot is filled with a relatively incompressible fluid, such as oil. In operation the hydrostatic pressure of the fluids within the well is transmitted through the boot to the oil within the housing and is there balanced by the incompressibility of the oil which, at the same time, effects an efficient acoustical connection between the well fluids and the interior of the housing.

Figure 2:
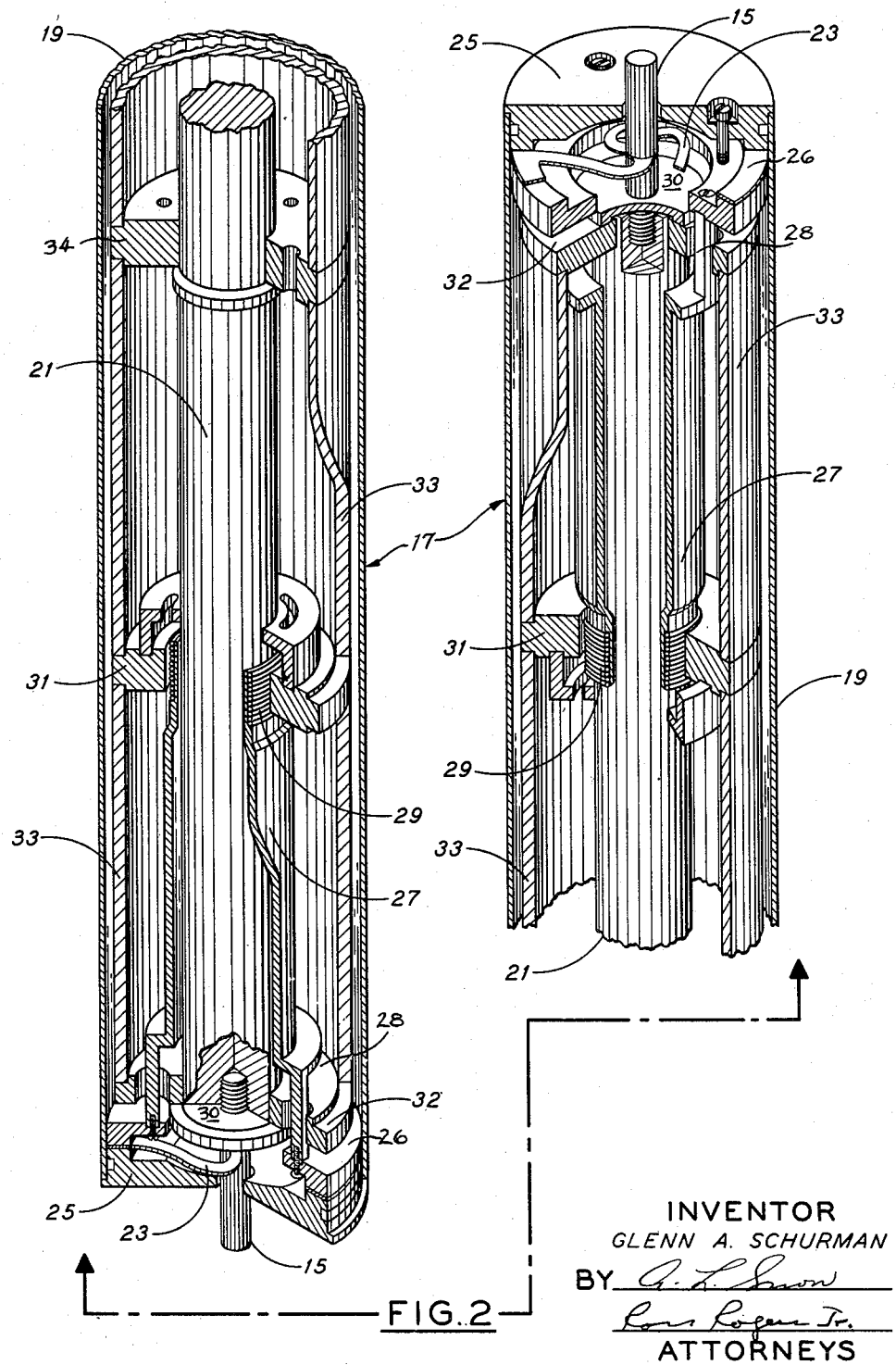
Figure 2 is a sectional view of a seismometer which forms a part of the logging tool. The seismometer is broken for purposes of this drawing to enable the use of a larger illustration.

The slotted cage 7 encloses and supports the seismographic portions of the logging tool comprising the seismometer 17 as shown in Figure 1 and in more detail in Figure 2. The support of the seisomometer is provided by a pair of projecting supports 15 having a threaded engagement with plates 16 suitably fixed to the interior of the cage 7. The interior portions of the supports 15 rigidly support the magnet and pole structures of the seismometer as well as flexibly supporting the relatively movable parts thereof as will be more fully seen hereinafter.

Figure 2 shows the details of the seismometer 17. The seismometer is oil-filled and the oil within the seismometer communicates through a small passageway, not herein shown, with the oil within cage 7. A light aluminum cage 19 surrounds the seismometer. A central core piece 21 is threadedly secured to the support 15 and a pair of spider springs 23 are fixed to the support 15 at the center and between portions of the case and end plates 25 at the periphery thereof at either end of the case to provide a resilient, relatively movable support between the case 19 and the supports 15. Since the core supports 15 protrude from case 19 and are rigid with the cage 7, the relatively movable parts of the seismometer are flexibly supported by the springs 23.

A pair of plates 26 are supported within the casing, by suitable screws as shown, on the end plates 25. The plates 26 have a pair of coil supports 27 secured thereto by means of longitudinally extending struts 28 passing through suitable apertures in pole pieces 32 of the seismometer 17. Coils 29 are provided on the coil supports 27.

A plurality of cylindrical magnets 33 are provided just inside the aluminum case 19, being supported on the core 21 by pole pieces 32 positioned between a shouldered end of the core 21 and a plate 30 secured in position by the attachment to supports 15. The magnets 33 at the two ends of the seismometer 17 have their like polarity poles and pole pieces 31 positioned adjacent to the end of coil supports 27 with the coils 29 located in the air gap between the pole pieces 31 and the core 21. The end magnets 33 are provided with pole pieces 32 as described and the cylindrical magnets at the center of case 19 are provided with pole pieces 34 contiguous to the core 21. It should be understood that like poles of the magnets 33 are positioned to concentrate their magnetic flux at the air gaps between the pole pieces 31 and the core 21 where the coils 29 are positioned, while the respectively opposite poles are provided with a magnetic path through pieces 32 and 34.

In operation, the logging tool shown in Figure 1 is introduced into the well. An explosive charge is set off at or near the surface of the ground in the vicinity of the well. If the shot is very close to the mouth of the well, the cable borne energy will arrive at the seismometer 17 before the signal which passes through the formation. The cable energy will shake the entire logging tool, causing the magnets 33 and the associated pole structure to move relative to the coil 29, thereby generating an electrical signal which is pasesd through the cable to the surface. The logging tool will weigh approximately a hundred pounds, since it has a rugged steel construction. The amplitude of the electrical signal generated by the cable energy is limited in magnitude because the vibration passing through the cable must move the substantial weight of the entire logging tool. The seismic signal passing through the formation enters the well fluid from the walls of the well, passes through the elastic boot 13 through the slots in the cage 7 to the case 19 of the seismometer 17. The vibration of the fluid within the logging tool moves the case 19 of the seismometer 17. The case 19, ends 25 and coil supports 27 are made of aluminum. Accordingly, their weight, together with the weight of the coil 29, is approximately a pound or less. The seismometer is moved in response to the formation signal through the viscous drag of the oil on the case 19 within the rubber boot 13. The lightness of the elements which must be moved allows the formation signal to cause a large amplitude movement of the case 19 relative to the magnets and pole structure of the seismometer and the protective housing of the logging tool. The electrical signal returned to the surface is dependent on the relative movement between these heavy elements and the case with its associated light elements. The movement of the coil resulting from the arrival of the formation signal is large compared to the movement of the coil resulting from the arrival of the cable signal because the weight of the seismometer case-coil structure is light compared to the weight of the complete logging tool.

It is to be noted, then, that the cable break is suppressed by causing the detector to be selectively sensitive and, therefore, to be more responsive to the signal which has passed through the formation than to the signal which passes along the cable. The protective casing 17 and weighted member 5 need not be moved to cause the seismometer to respond to the formation signal. The sensitivity of the seismometer is further increased by the fact that the moving elements of the seismometer are the lightest elements. The coil 29 and its supporting elements may be made extremely light while the size and weight of the magnet and core structure in the seismometer is determined largely by the required sensitivity of the instrument.

By allowing the heavy elements of the seismometer in the entire logging instrument to remain stationary while the signal in the well fluid moves only the light elements, I have provided a highly sensitive instrument. My seismometer is found to be approximately six times as sensitive as prior art seismometers of which I am aware which employ sensing elements within a pressure vessel. It is seen, then, that if a conventional deep well seismometer would emit signals of equal amplitude for the cable break and the first formation break, my seismometer will emit a signal from the formation break six times the strength of the cable break signal. Further, the records obtained with my seismometer are of superior quality. The small mass of moving elements allows the device to respond to high frequencies and thereby provide a sharp indication of the first energy arrival. This sharp arrival, in turn, allows more accurate record analysis.

Although I have shown and described a preferred embodiment of my invention, I realize that many modifications thereof are possible without departure from the spirit and scope of the invention. I do not intend, therefore, to limit my invention to the specific embodiment disclosed.

I claim:

1. For use in detecting signals, a detector comprising a coil of wire resiliently supported from and adjacent to a permanent magnet and pole piece, a rigid casing enveloping said coil and said pole piece, said casing being rigidly secured to said coil, said casing and said coil being light compared to said permanent magnet and pole piece, a perforated protective housing for said casing, the perforations in said housing being adapted to admit seismic energy through said protective housing to said casing, said housing being rigidly affixed to said pole piece, and a cable affixed to said housing, said cable being adapted to support said housing.

2. For use in obtaining an acoustic log of a well containing fluids, the combination comprising a cable, a perforated metal housing rigidly affixed to said cable and adapted to be supported in said well by said cable, a vibration detector having moving elements resiliently affixed to said housing and stationary elements rigidly affixed to said housing, the moving elements of said vibration detector being light compared to said housing, and means for providing acoustic coupling through openings in said perforated metal housing between said moving elements and said well fluids.

3. The combination according to claim 2 in which a fluid-tight membrane covers the openings in said perforated metal housing and a relatively incompressible fluid confined by said membrane.

4. For use in obtaining an acoustic log of a well, the combination comprising a cable, a perforated housing rigidly affixed to said cable and adapted to be supported in said well by said cable, a vibration detector resiliently affixed to said housing and within said housing, said vibration detector being light compared to said housing, and a fluid-tight membrane of a sound-transmitting nature covering the openings in said perforated housing.

5. For use in obtaining an acoustic log of a well, a detector comprising a cable extending into the well, a ported housing affixed to said cable and adapted to be supported by said cable in said well, a vibration detector having a permanent magnet, pole pieces adjacent to and providing an air gap for said magnet, a coil of wire within said air gap, a resilient connection between said coil and said magnet, a rigid case enclosed in said housing and surrounding said magnet, pole pieces and coil, said case and said coil being light compared to said permanent magnet and pole piece, a rigid connection between said coil and said rigid case, and a connection by which said pole pieces are rigidly supported from said housing.

References Cited in the file of this patent

UNITED STATES PATENTS

| | | |
|---|---|---|
| 1,923,107 | McCollum | Aug. 22, 1933 |
| 2,137,985 | Salvatori | Nov. 22, 1938 |
| 2,232,476 | Ritzmann | Feb. 18, 1941 |
| 2,396,935 | Walstrom | Mar. 19, 1946 |
| 2,425,868 | Dillon | Aug. 19, 1947 |
| 2,440,903 | Massa | May 4, 1948 |
| 2,522,433 | Dahlberg | Sept. 12, 1950 |
| 2,675,533 | Brown | Apr. 13, 1954 |
| 2,681,442 | Schurman | June 15, 1954 |